United States Patent [19]

Giangardella

[11] Patent Number: 5,623,259
[45] Date of Patent: Apr. 22, 1997

[54] MOTION DETECTOR SENSOR SYSTEM FOR POSITIONING VEHICLE

[76] Inventor: John Giangardella, #3 Calle Del Apice, San Clemente, Calif. 92672

[21] Appl. No.: 410,222

[22] Filed: Mar. 24, 1995

Related U.S. Application Data

[63] Continuation-in-part of Ser. No. 145,000, Oct. 29, 1993.

[51] Int. Cl.⁶ .............................. B60Q 1/48; B60Q 1/00; G08B 79/00
[52] U.S. Cl. .................... 340/932.2; 340/435; 340/507
[58] Field of Search .................. 340/932.2, 942, 340/958, 435, 565, 555, 556, 507, 933; 250/491.1

[56] References Cited

U.S. PATENT DOCUMENTS

| | | | |
|---|---|---|---|
| 3,716,833 | 2/1973 | Roth | 340/61 |
| 4,274,091 | 6/1981 | Decker | 340/583 |
| 4,665,378 | 5/1987 | Heckethorn | 340/51 |
| 4,694,295 | 9/1987 | Miller et al. | 340/903 |
| 4,766,421 | 8/1988 | Beggs et al. | 340/904 |
| 4,808,997 | 2/1989 | Barkley et al. | 340/942 |
| 5,166,681 | 11/1992 | Bottesch et al. | 340/933 |
| 5,208,586 | 5/1993 | Friberg et al. | 340/932.2 |
| 5,249,128 | 9/1993 | Markandey et al. | 340/903 |
| 5,309,147 | 5/1994 | Lee et al. | 340/567 |
| 5,313,189 | 5/1994 | Dodd et al. | 340/433 |
| 5,416,476 | 5/1995 | Rendon | 340/905 |
| 5,485,347 | 1/1996 | Miura | 364/557 |

Primary Examiner—Edward L. Coles, Sr.
Assistant Examiner—Jerome Grant, II
Attorney, Agent, or Firm—Herbert M. Shapiro

[57] ABSTRACT

A tubular shroud defines the field of view of a passive infrared sensor placed above the desired stopping point for a vehicle in a garage. As the vehicle enters the field of view, a warning signal is activated. A second sensor, with a field-defining shroud, placed in the path of an oncoming vehicle may be used to activate the first sensor ensuring that the warning signal is produced only in response to the arrival of a vehicle at the desired position rather than in response to the movement of a person or an animal.

13 Claims, 4 Drawing Sheets

5,623,259

MOTION DETECTOR SENSOR SYSTEM FOR POSITIONING VEHICLE

REFERENCE TO RELATED APPLICATION

The present application is a Continuation-in-part of patent application Ser. No. 08/145,000 filed Oct. 29, 1993.

FIELD OF THE INVENTION

This invention relates to apparatus for alerting the driver of a vehicle when the vehicle has reached a predetermined point. More particularly, the present invention relates to such apparatus which utilizes focused infrared motion detection sensing devices arranged to trigger an audible or visible alarm.

BACKGROUND OF THE INVENTION

The prior art includes a number of arrangements for monitoring a vehicle's motion or position using light beams, infrared beams, ultrasonic beams, microwave beams, etc., coupled with a variety of signalling means. The following patents disclose such arrangements:

U.S. Pat. No. 4,808,997 to Barkley shows an arrangement including a photoelectric device for signalling the position of a vehicle. Briefly, a photoelectric beam is either reflected by a vehicle intercepting the beam or interrupts a beam reflected back to the transmitter by a mirror to signal the presence of the vehicle in the beam path.

U.S. Pat. No. 5,208,586 to Friberg discloses an arrangement for signalling when a vehicle has reached a predetermined position in a garage using an ultrasonic pulse generator and receiver and complex control circuitry.

U.S. Pat. No. 4,665,378 to Heckethorn discloses vehicle garaging methods and apparatus including a concentrated light beam which illuminates a spot on the floor when no vehicle is present and illuminates a spot on the dashboard (for example) when the vehicle is properly parked.

U.S. Pat. No. 5,128,670 to Jackson discloses a signalling system for intersecting railroads. In accordance with the Jackson arrangement, a light beam is projected across a roadway at a receiver. As a car breaks the beam, a caution signal is triggered to alert the driver that he or she is approaching an intersection.

U.S. Pat. No. 3,840,848 discloses a traffic monitoring arrangement including infrared transmitters for measuring the distance between vehicles. If a second vehicle is traveling too close to a first vehicle, a roadside sign is lighted warning the driver of the following vehicle of the hazardous practice.

All of these arrangements involve relatively high cost or complex positioning strategies. They are not easily translated to home use and/or multicar garages.

Less sophisticated prior art arrangements, however, which are suitable for home use are less reliable. Mechanical setups, such as compressed air hoses which trigger a signal responsive to the physical pressure of a vehicle on the hose or weights hung from the ceiling which the driver can see or which touch the vehicle when the vehicle is in the proper position can easily be moved out of position. None of the prior art arrangements combine the precision of the more sophisticated arrangements with the low cost and versatility of the less sophisticated arrangements.

BRIEF DESCRIPTION OF A ILLUSTRATIVE EMBODIMENTS OF THIS INVENTION

In accordance with the principles of this invention, a simple, simple to use and inexpensive means suitable for home as well as business use for safely parking vehicles is provided. The apparatus of the invention is easy to use, easy to install and easy to adjust.

In one embodiment of the invention, an infrared motion sensing detector is mounted on the ceiling of a garage. A tubular shroud concentrates the area of motion detection to a relatively small circumscribed area on the floor of the garage. As the leading edge of a vehicle enters the area sensed by the motion detector, a visible or audible alarm is triggered.

In another embodiment of the invention, a second motion detector is placed to detect the leading edge of a vehicle as it enters a garage providing the driver with a caution signal. The first detector then signals the driver when the vehicle reaches the point at which it should stop. The additional elements of this second embodiment ensures that the motion detector signalling the stop position for the vehicle is not falsely triggered by an animal, perhaps, or a person in the garage.

Although infrared motion detectors are available commercially, the use of such detectors for car positioning in a garage requires operation of the detectors in a manner quite different from the common usage of such detectors and a significant change in the control of the detectors which applicant believes would not recommend such detectors for use in automobile positioning applications. Specifically, the detectors are responsive only to simultaneous changes in temperature and motion. In addition, the change in temperature is on the order of only a few degrees while the change in position also is only on the order of up to a few feet per second. Further, the system requires only a single pulse for activation and is organized to ensure activation in the presence of the occurrence of a single set of temperature and motion excursions. This is to be distinguished from prior art uses of infrared detectors which require repetitive pulses for operation. Further, infrared detectors typically are responsive to large changes in temperature (body temperature). The use of two such detectors with an adjustable angle therebetween for activating the system and for avoiding false triggering of the system also employs infrared detectors in a manner not at all obvious from prior art usage of infrared detectors.

DETAILED DESCRIPTION OF ILLUSTRATIVE EMBODIMENTS OF THEIS INVENTION

Figure 1:
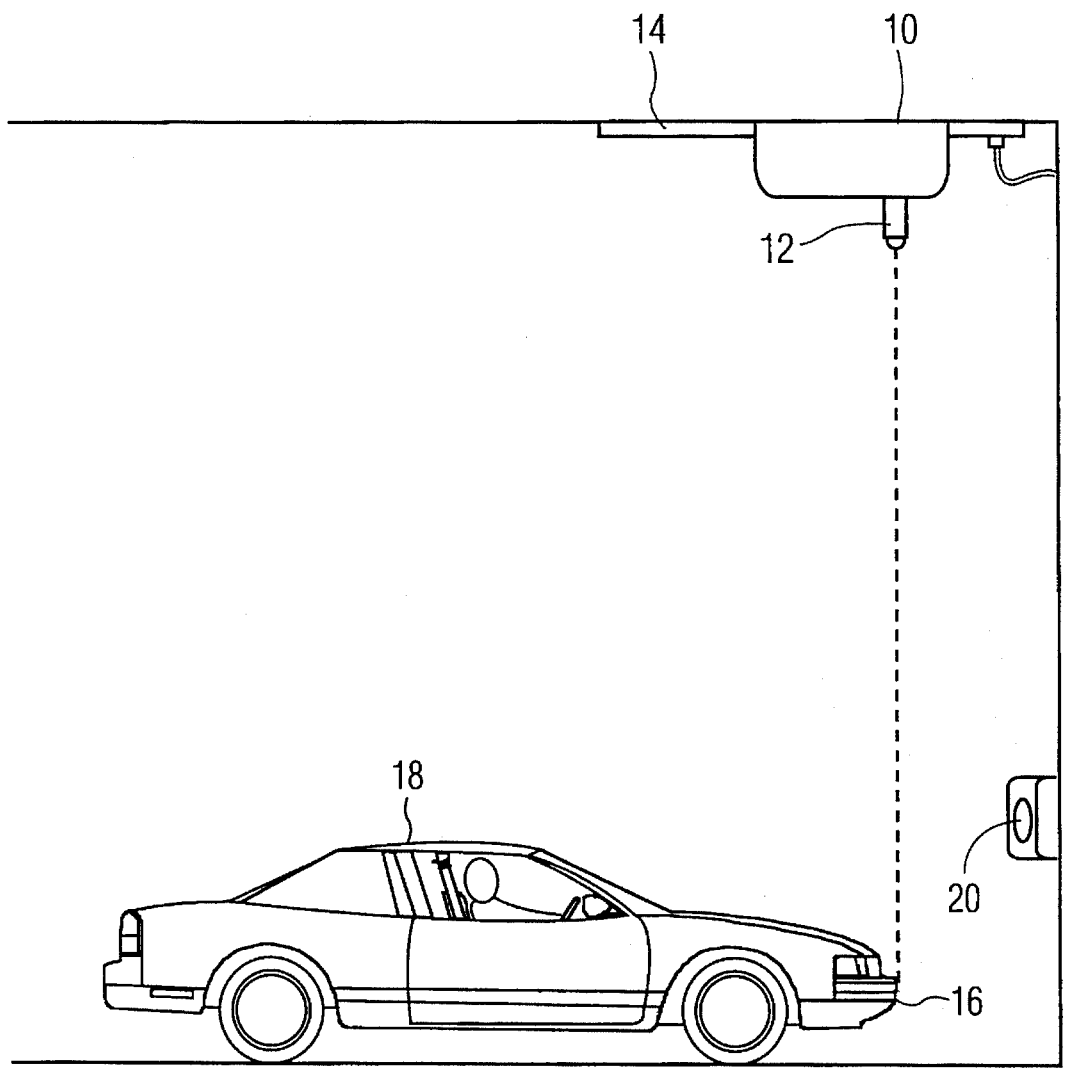
FIG. 1 is a perspective view of a typical arrangement in accordance with the principles of this invention illustrating a single sensor arrangement.

FIG. 1 shows a single sensor arrangement in accordance with the principles of this invention. The arrangement includes a motion sensor 10 attached to the ceiling of a garage as shown in the figure. Sensor 10 utilizes a passive infrared (PIR) motion sensing device commercially available and used generally for purposes of security. One suitable infrared detector is described in U.S. Pat. Nos. 4,882,567 and 4,377,808. Such devices are available from Nippon Semiconductor (SPT-23). Typically, the PIR element detects movement within it's field of view by sensing temperature variations. Variations occur only when there is motion. Regardless of whether there are different temperature variations within the field of view or not, a signal is generated only when there is a variation from the steady state condition.

Such motion sensing devices typically include lenses for focusing the area of detection. The devices generally include switches which control power to devices, such as spotlights, when motion in the vicinity of a door is detected.

Cylindrical shroud 12 is a tubular collar fitted to the sensor. Shroud 12 defines the area within which detector 10 senses objects.

Sensor 10 is operated to respond only to simultaneous motion and temperature changes. The device is controlled to respond to temperature changes of at least one to three degrees and motion of at least one foot per second. In the absence of either change in about the range prescribed, the sensor is inhibited from providing an alarm. This operation is to be contrasted with prior art uses of passive infrared sensors which not only require multiple pulses to operate, but also respond to body temperatures, not to the low temperatures to which the sensors are controlled to respond in accordance with the principles of this invention. Sensors, in accordance with the principles of this invention, employ a gain of over forty thousand to ensure that any simultaneous change in temperature and motion is sensed and that an alarm is generated.

Track 14 is mounted to the garage ceiling. The design of the track is not critical to the invention. The purpose is simply to permit the motion sensor to be moved backward and forward along the track to adjust the area sensed by the motion sensor.

As an illustration, track 14 may be similar to a track used in lighting. Motion sensor 10 is attached to track 14 in such a way as to permit the sensor to slide along the track. Repositioning the motion sensor permits the desired stopping position of the vehicle to be changed.

Signal light 20, mounted on the back wall of the garage at a position well within the view of the driver, is controlled by the motion sensor and is responsive to motion within the sensing area of the sensor. Thus, as bumper 16 of the vehicle 18 enters the field of view, signal light 20 is turned on. Since the vehicle is in position and may remain so for a relatively long time, signal light 20 will turn off after a suitable delay, perhaps three minutes, and sensor 10 will not signal the presence of another vehicle within it's field of view until vehicle 18 leaves the field.

Motion sensors of the type, used in systems in accordance with the principles of this invention, are arranged to signal the entrance of an object within it's field of view, to time out an alarm if the object remains within the field for a sustained period, and to reset itself when the object leaves the field.

Figure 2:
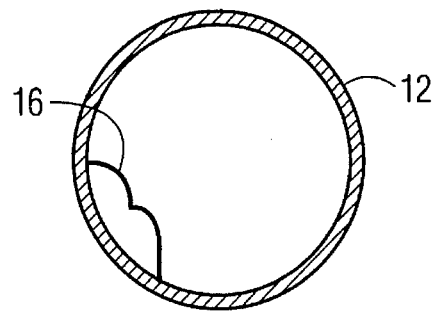
FIG. 2 is an end view of a shroud for use in the embodiment of FIG. 1.

FIG. 2 is a cross sectional view of shroud 12. In the embodiment shown, shroud 12 is a right circular cylinder. Clearly, the cross sectional shape of the shroud is not important and it could easily have been rectilinear or some other shape. FIG. 2 illustrates bumper 16 entering the field of view of sensor 10 as defined by shroud 12.

Figure 3:
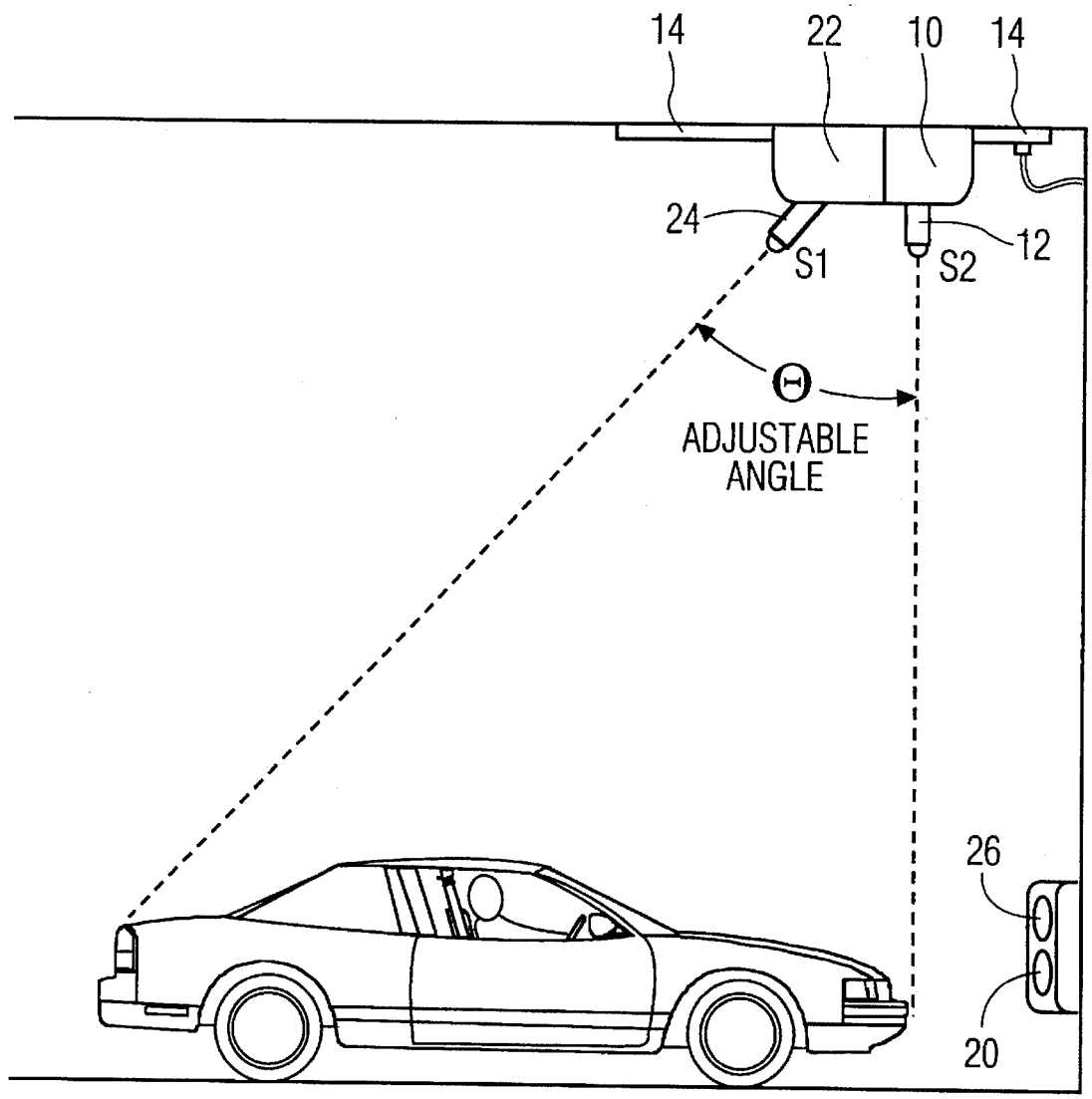
FIG. 3 is a view of a typical arrangement in accordance with the present invention illustrating two sensors.

FIG. 3 shows an arrangement, in accordance with the principles of this invention, and utilizing two motion sensors for providing the driver of a vehicle with additional control. The figure shows sensor 10 and shroud 12, once again, defining a point (that is the small scanning area of sensor 10 and shroud 12) at which the vehicle is to stop. A second motion sensor 22, having a field-narrowing shroud 24 connected to it, is also mounted on track 14. Motion sensors 10 and 22 are arranged so that the field viewed by them are in a plane generally parallel to the direction of motion of the vehicle. More specifically, as the vehicle is driven into the garage, roughly the same point on the vehicle which enters the field of sensor 22 will also enter the field of sensor 10.

Signal light 26 is connected to and controlled by sensor 22. In a typical embodiment of this invention, signal light 26 may be yellow and signal light 20 will be red. Again, with reference to FIG. 3, a vehicle entering the garage from the left, as viewed in the figure, would enter the field of sensor 22 first and signal light 26 would light up. As the vehicle advances, it will enter the field of sensor 10 and the signal light 20 will light up. To further illustrate the operation of this embodiment of this invention, FIG. 3 shows two position settings for sensor 22. If a driver prefers an earlier warning, sensor 22 is set to a greater angle relative to sensor 10.

Figure 4:
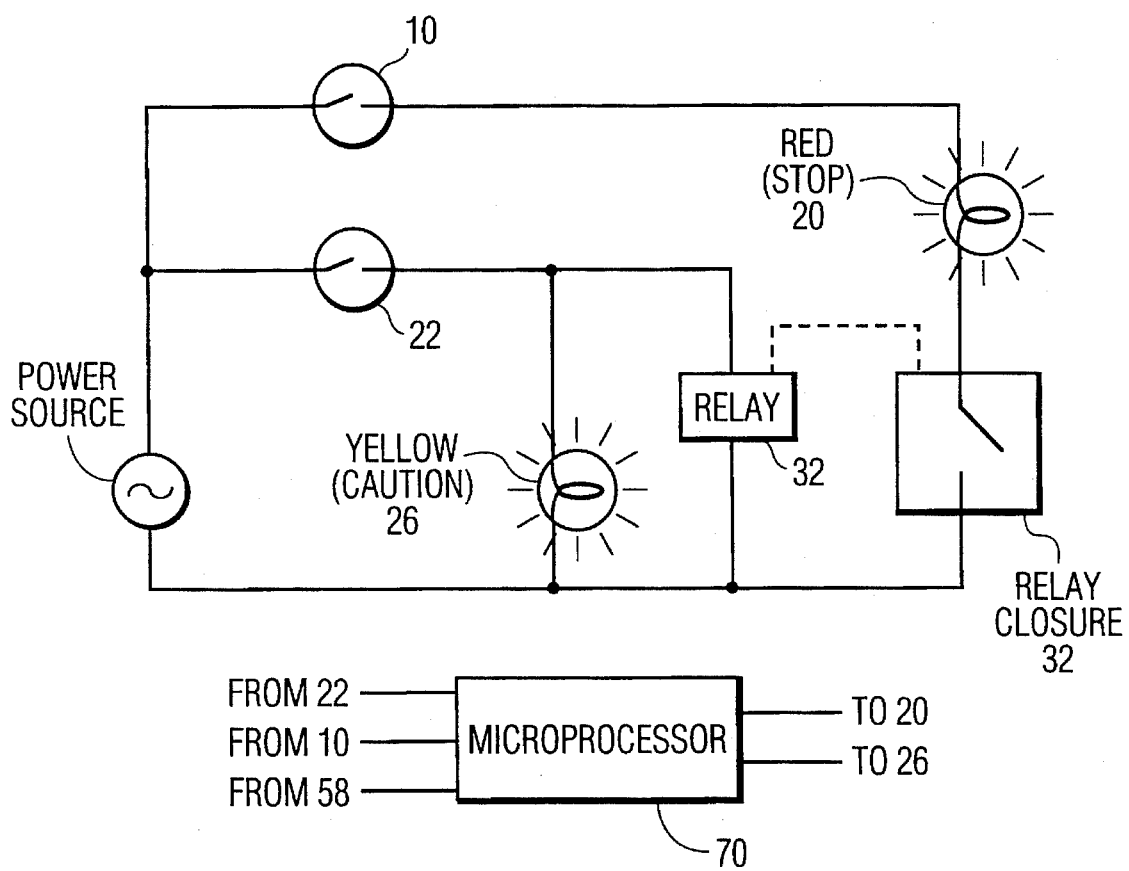
FIG. 4 shows in schematic diagram form a useful arrangement for avoiding false triggering of the motion detectors in a two detector arrangement.

FIG. 4 is a schematic diagram of elements comprising a two-sensor detector arrangement like that shown in FIG. 3 further including elements to ensure that the stop signal is not incorrectly triggered by a person or a pet wandering into the sensing field of sensor 10. As seen in FIG. 4, power is supplied to both sensors 10 and 22 at all times. When sensor 22 detects motion within it's sensing field, it turns the yellow caution light on. At the same time, relay 32 is activated (relay closed). If the object which triggered sensor 22 is a vehicle, it will also trigger sensor 10 and current will flow through red warning light 20. If relay 32 is not closed, light 20 will not be illuminated. Thus, if sensor 10 sensed an object and sensor 22 did not sense an object, neither warning light would be illuminated.

FIG. 3 shows placement dimensions for a typical garage setup. Where the ceiling of a garage is eight feet high and the angle is about 53 degrees and where the ceiling is ten feet high and the angle is about 51 degrees. With vehicle speeds of approximately three feet per second (about two mph), there will be about a two-second warning for the driver which is well within reasonable limits.

Figure 5:
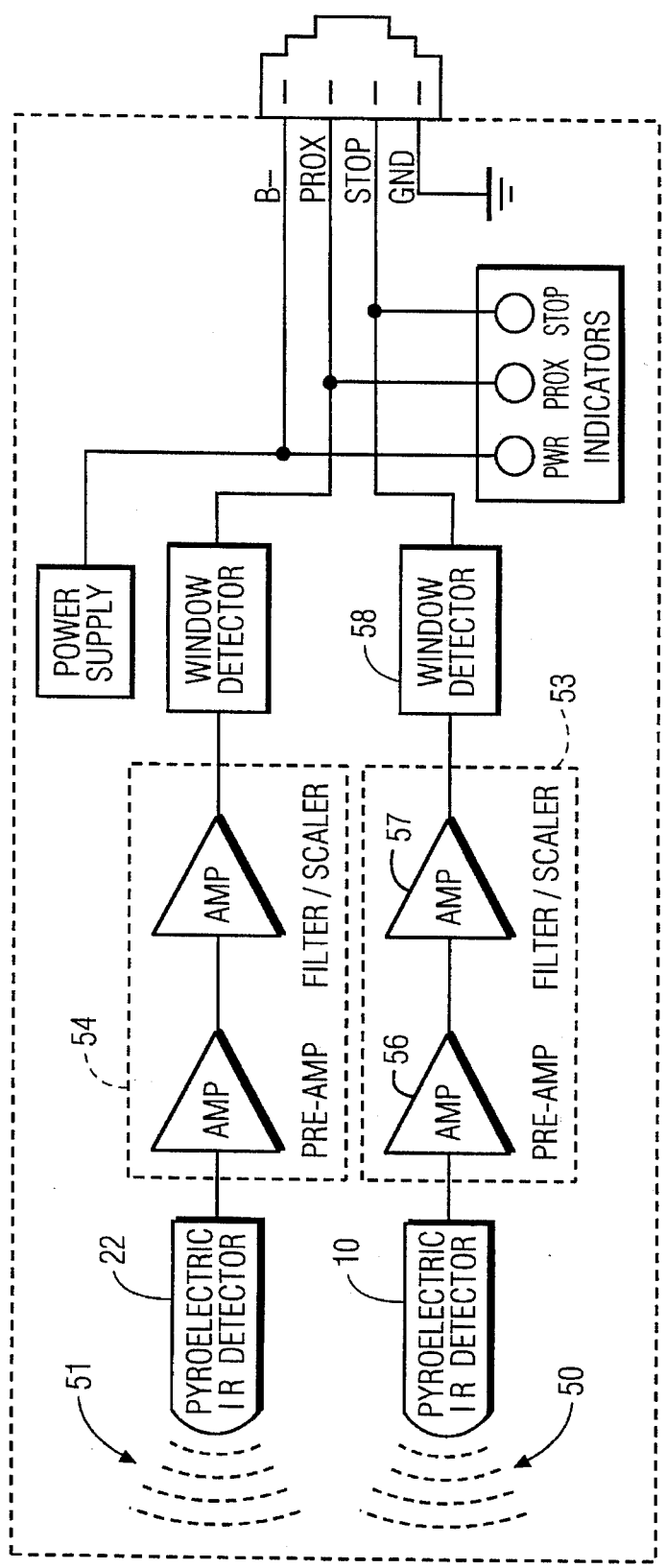
FIG. 5 is a schematic block diagram of the circuit for controlling the operation of the arrangement of FIG. 4.

FIG. 5 shows sensors 10 and 22 responsive to temperature and motion changes in a narrow field of view and in a relatively broad field of view as indicated by the broken lines 50 and 51 respectively. The outputs of the sensors are connected to amplifier means 53 and 54 respectively. Amplifier means 53 includes two amplifier stages 56 and 57 operative as a preamplifier and a filter/scaler as indicated in the figure. Stage 56 amplifies the output of the sensor one hundred and twelve times in the commercial embodiment of the invention. Stage 57 amplifies the signal three hundred and seventy three times for a gain of forty one thousand, seven hundred and seventy six in the commercial unit. The thus amplified signal is input to a window detector, 58, which is set to respond to signals in a window of plus or minus 0.0227 volts. This window setting is designed to respond to simultaneous temperature and motion changes of greater than three degrees and greater than one foot per second. The amplifiers are tuned to have a signal to noise ratio of less than ten.

Figure 6:
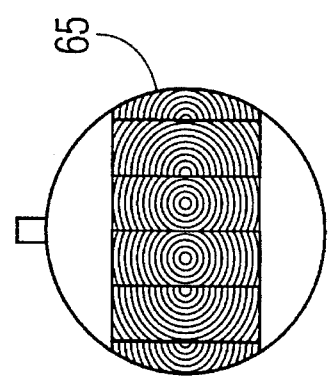
FIG. 6 is a schematic representation of a multifaceted lens used with the sensors of FIGS. 1 and 3.

FIG. 6 is a view of a multifaceted lens 65 used with the sensors of FIGS. 1 and 3. The lens is 1.0483 inch in diameter and 0.0280 inch thick in the commercial embodiment. Also, in the commercial embodiment a microprocessor is employed to monitor and control the various functions herein such as, for example, to inhibit the sensors in the absence of changes in temperature and motion in the prescribed ranges. The microprocessor, 70, is shown in FIG. 4.

While the embodiments of this invention have shown the sensors suspended from the ceiling of the garage, because of the different arrangements of structures and the placement and operation of the garage doors, it is clear that the sensors could be mounted on the walls of the garage as well as on the ceiling. Correspondingly, the alarm devices shown herein might as readily have been audible signals and placed otherwise on the back wall of the garage or enclosure.

What is claimed is:

1. Apparatus for positioning a vehicle on a supporting surface within an enclosure, said apparatus comprising a first infrared motion sensor for sensing simultaneous changes in temperature and motion and means responsive to an output from said sensor for providing a signal to a driver of said vehicle that the vehicle has arrived at a predesignated position, said apparatus including a shroud coupled to said sensor and operative to confine the field of view of said sensor to said predesignated position, said apparatus also including control means for inhibiting said sensor from producing an output pulse responsive to temperature changes and motion changes outside of a range of less than about three degrees and one foot per second.

2. Apparatus as in claim 1 wherein said enclosure is a garage and said means for controlling inhibits said sensor from responding to changes in temperature and motion of less than three degrees and one foot per second.

3. Apparatus as in claim 1 also including a second infrared sensor and means for mounting said second sensor to said enclosure and means for adjusting the angle between said first and second sensors.

4. Apparatus as in claim 3 wherein said second sensor also responds to temperature and motion changes within said temperature and motion ranges, said apparatus also including means responsive to an output from said second sensor for activating said first sensor.

5. Apparatus as in claim 3 wherein said enclosure is a garage, said apparatus also including track means for slidably connecting said first and second sensors to the ceiling of said garage wherein said first and second sensors are arranged to detect simultaneous changes in temperature and motion in a plane defined by the direction of motion of said vehicle in said garage.

6. Apparatus as in claim 1 also including a multifaceted lens coupled to said first sensor.

7. Apparatus as in claim 1 also including amplifier means for increasing the gain of said output pulse over forty thousand times, said apparatus also including a window comparator connected to the output of said amplifier means for responding only to outputs from said amplifier means only within a prescribed fraction of a volt.

8. Apparatus as in claim 1 also including a warning lamp for providing said signal to said driver.

9. Apparatus as in claim 1 also including a track for adjusting the position of said sensor.

10. Apparatus as in claim 9 wherein said second sensor also responds to temperature and motion changes within said temperature and motion ranges, said apparatus also including means responsive to an output from said second sensor for activating said first sensor.

11. Apparatus as in claim 9 wherein said enclosure is a garage, said apparatus also including track means for slidably connecting said first and second sensors to the ceiling of said garage wherein said first and second sensors are arranged to detect simultaneous changes in temperature and motion in a plane defined by the direction of motion of said vehicle in said garage.

12. Apparatus for positioning a vehicle on a supporting surface within an enclosure, said apparatus comprising a first infrared motion sensor for sensing simultaneous changes in temperature and motion and means responsive to an output from said sensor for providing a signal to a driver of said vehicle that the vehicle has arrived at a predesignated position, said apparatus including a shroud coupled to said sensor and operative to confine the field of view of said sensor to said predesignated position, said apparatus also including control means for inhibiting said sensor from producing an output pulse responsive to temperature changes and motion changes outside of a range of less than about three degrees and one foot per second, said apparatus including a second infrared sensor and means for mounting said sensor to said enclosure and means for adjusting the angle between said first and second sensors.

13. Apparatus as in claim 12 also including a multifaceted lens coupled to said first sensor.

* * * * *